Oct. 5, 1965 C. A. ANDREWS ETAL 3,210,734

MAGNETIC CORE TRANSFER MATRIX

Filed June 30, 1959 6 Sheets-Sheet 1

INVENTORS
CARROLL A. ANDREWS
WILFRED D. THONER
ROGER D. WATSON
CHARLES J. TILTON

BY Thomas & Crickenberger
ATTORNEYS

Oct. 5, 1965 C. A. ANDREWS ETAL 3,210,734

MAGNETIC CORE TRANSFER MATRIX

Filed June 30, 1959 6 Sheets-Sheet 2

MAGNETIC CORE TRANSFER MATRIX

Filed June 30, 1959 6 Sheets-Sheet 3

MAGNETIC CORE TRANSFER MATRIX

Filed June 30, 1959 6 Sheets-Sheet 4

Oct. 5, 1965 C. A. ANDREWS ETAL 3,210,734

MAGNETIC CORE TRANSFER MATRIX

Filed June 30, 1959 6 Sheets-Sheet 6

United States Patent Office 3,210,734

Patented Oct. 5, 1965

3,210,734

MAGNETIC CORE TRANSFER MATRIX

Carroll A. Andrews, Poughkeepsie, and Wilfred D. Thoner, Hyde Park, N.Y., Roger D. Watson, Fort Worth, Tex., and Charles J. Tilton, Hyde Park, N.Y., assignors to International Business Machines Corporation, New York, N.Y., a corporation of New York

Filed June 30, 1959, Ser. No. 824,119
4 Claims. (Cl. 340—172.5)

This invention relates to an input device for a data processing system, and more particularly to an input device which employs a unique encoding arrangement with a magnetic core transfer matrix for transferring a sequence of binary bits of coded information in a predetermined order to data processing equipment.

In computer applications, the reliability of the equipment, speed of operation, physical size and cost are all factors of importance to be given consideration. It has been customary to employ a shifting register when introducing binary bits of information from an encoding device into a word register where a full computer word is being formed. The bits of information which make up the bytes or characters are usually fed into a word register at one end and shifted therealong into the final position of the word in which they appear. This shifting process involves a time delay for a shift between positions in the register in order to allow each position to read out its information to the succeeding position and be conditioned to receive information from the preceding position.

A usual circuit employed to effect this time delay is a diode-capacitor combination connected between adjacent information positions in the shifting register. In addition to these delay circuits, shift gates must be provided to control the shift pulses required to step the information bits into their proper position. Also, it is necessary to shift the information bits as many times as there are bits in a character, a requirement which could introduce a significant loss in speed of operation when a large number of characters are formed into a word. For these reasons it is highly desirable to be able to transfer information without the use af a shifting register.

In addition to utilizing a shifting register to arrange the computer words being formed, it has been the practice formerly to use separate encoding matrices for each code desired. This means that the number of components, cost and space required increases with the number of codes being used.

A feature of the present invention is the elimination of the need for a shifting register and the attendant circuit components by providing a device which will transfer information from the encoding device of a computer, and place the information in its proper position in a word register.

Another feature of the invention is the provision of a transfer device which will operate in one of a plurality of binary codes.

A further feature of the invention is the provision of an encoder which will encode in one of a plurality of binary codes with a minimum of components.

In one arrangement according to this invention, a computer input device, such as a typewriter, is used to energize an encoder which converts the typewriter signal to the appropriate binary information byte. One of a plurality of binary information codes may be selected on the typewriter, and the corresponding bytes or characters for these codes, which contain different numbers of bits of information, are generated in a single row of magnetic cores in the encoder. A gating circuit arrangement connects the encoder to the magnetic core transfer matrix, which transfers the information byte into its appropriate place in a word register. A control arrangement for the gating circuits enables the transfer matrix to be used in one of a plurality of codes. The particular code may be selected manually by the operator of the typewriter. Since the magnetic core transfer matrix transfers the information bytes into their proper positions in the word register, it is not necessary to utilize a shifting word register, and the transfer process is instantaneous.

This preferred embodiment of the invention is illustrated in the accompanying drawings in which.

Figure 1:
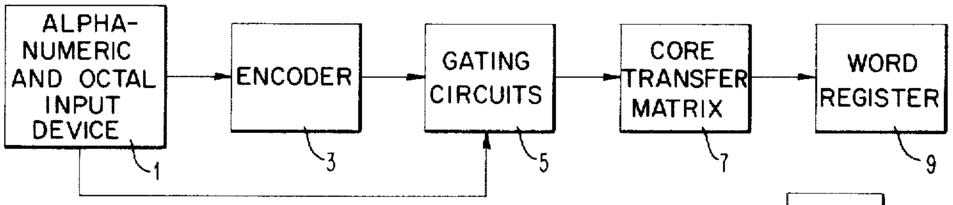
FIG. 1 is a block diagram of the system.

Referring now to FIG. 1 which is a block diagram of the system, the numeral 1 is used to indicate generally the alpha-numeric and octal input device of the system. In the present instance a typewriter is used for the input. The signals generated by the operation of the typewriter are fed into an encoder device 3 which translates these signals into binary information. The binary information passes from the encoder through a plurality of gating circuits, generally indicated by the numeral 5, into a magnetic core transfer matrix 7. The gating circuits are controlled from the input device 1 as to the proper byte positions, depending upon whether the alpha-numeric code or the octal code is selected. The binary information bytes passing from the encoder 3 through the gating circuits 5 to the core transfer matrix 7 are not stored in this matrix, but are transferred immediately to the word register 9. The information thus received in word register 9 is properly oriented as to byte position, and no shifting operations are required.

Figure 2:
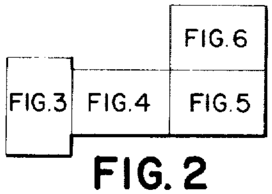
FIG. 2 shows the way in which the component figures of the drawings fit together to form the system.

The specific operation of the system shown in FIG. 1 will be more readily understood by referring to FIGS. 3 through 6. FIG. 2 shows the manner in which FIGS. 3 through 6 may be assembled to give a complete picture of the operation of the system.

Figure 3:
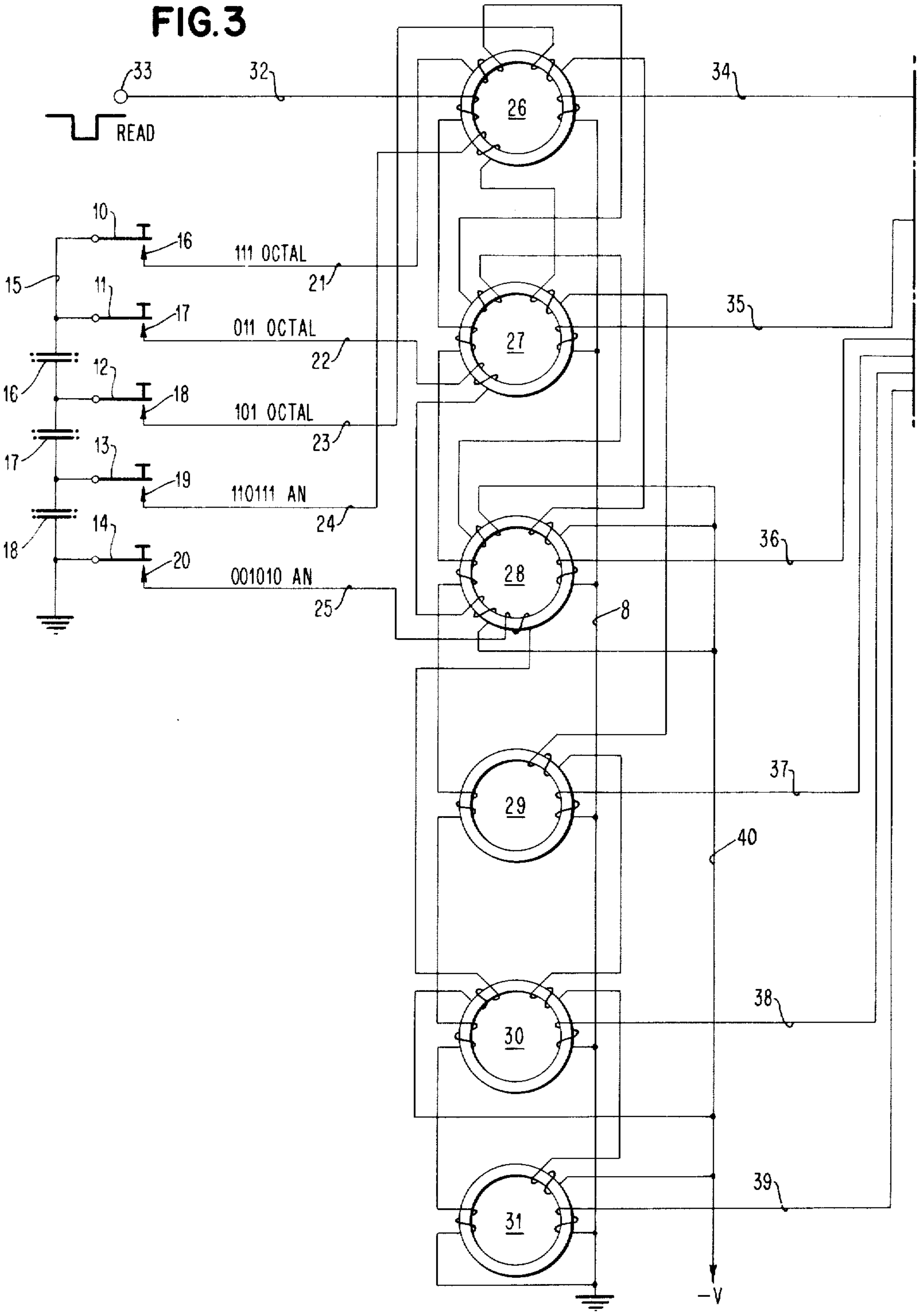
FIG. 3 is a circuit diagram showing the manner in which the typewriter keys energize the encoder.

The way in which the information is introduced into the system and encoded in binary form will be seen from a description of FIG. 3. In this figure a plurality of typewriter keys are indicated by the numerals 10 to 14. The typewriter keys are shown as being connected together by a common bus 15 which is grounded. The bus 15 is illustrated as being discontinuous at points 16, 17 and 18 since the number of keys shown is for purposes of description only, and in fact the typewriter will contain many more keys. Associated with the typewriter keys 10 to 14 are contacts 16 to 20 respectively, which serve as terminals for lines 21 to 25.

The encoder device comprises six bistable magnetic core elements 26 to 31. A read line 32 which has an input terminal 33 on one end is wound about each of the bistable magnetic cores 26 to 31 and has its other end grounded. A plurality of output lines 34 to 39 are each wound about cores 26 to 31, respectively, and terminate in a common ground bus 8.

The typewriter may operate in either the octal mode or the alpha-numeric mode, and there must be a typewriter key to represent each character to be encoded. Since the first eight characters in each code may be represented by the same corresponding binary numbers, these eight characters may be used interchangeably in either code. It is necessary, however, to employ separate keys for all other characters.

The encoding operation can be understood by following through the operation of the five sample keys shown in FIG. 3. Line 21 is wound about cores 26, 27 and 28 and then connected to bus 40, which goes to a source of negative potential —V. When typewriter key 10 is closed against contact 16, a circuit is completed from source —V through core 28, core 27, core 26, line 21 and key 10 to ground bus 15. The current thus produced is sufficient to change the stable states of cores 26 to 28. Assuming that all of the cores were in the Zero state by reason of a negative pulse on line 32 prior to encoding, then cores 26 to 28 would be set to the One state. Since there are only three bits of information to each character in the octal code, key 10 would represent the octal character 111.

When typewriter key 11 is depressed against contact 17, a circuit is completed from ground through bus 15, key 11 and line 22 which is wound about cores 27 and 28 and then connected to bus 40 which leads to the source of negative potential —V. Thus, key 11 represents octal character 011, since cores 27 and 28 are biased to the One state when key 11 is depressed. Similarly, keys 12, 13 and 14 represent octal character 101, alpha-numeric character 110111 and alpha-numeric character 001010, respectively. It will be appreciated that the encoder, when completely wired for operation in both codes, will have a large number of windings about the magnetic core elements. For the sake of clarity and the purpose of the description here, an incomplete keyboard has been shown. It is believed that the manner in which the remaining keys would be wired, as well as the operation thereof, will be apparent to one skilled in the art.

Figure 4:
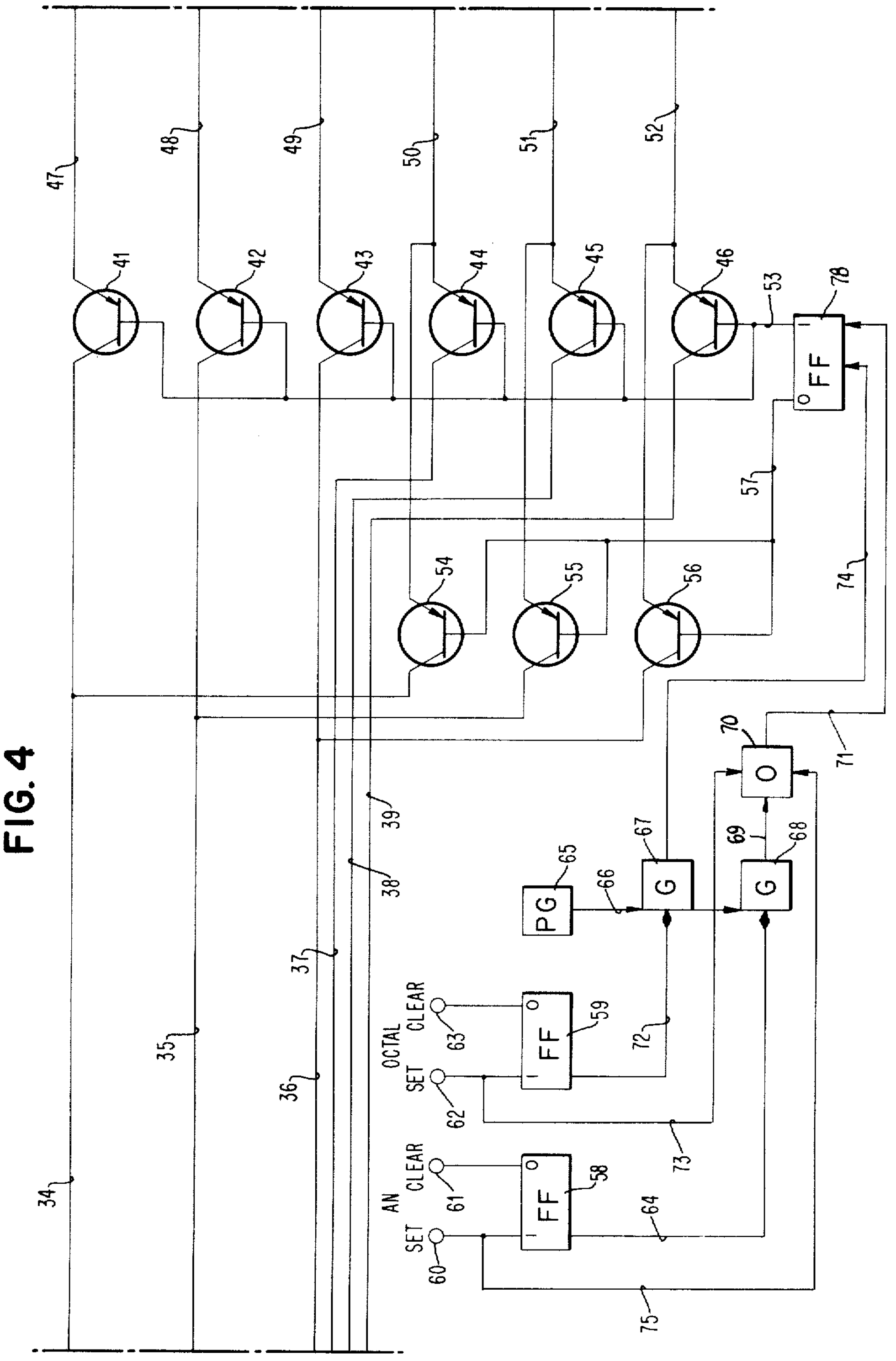
FIG. 4 is a circuit diagram of the gating arrangement showing the control therefor.

The gating circuits, which control the transfer of the binary information bits from the encoder 3 through the core matrix 7 are shown in FIG. 4 of the drawings. The gating elements employed here are simply transistor switches which are biassed on or off by a flip-flop device 78. Transistors 41 to 46 are connected in series between input lines 34 to 39 and output lines 47 to 52, respectively. The base elements of transistors 41 to 46 are connected to a common bus 53 which is energized by the One line output of flip-flop 78. Transistors 54 to 56 are connected in series between input lines 34 to 36 and output lines 50 to 52 respectively. The base elements of transistors 54 to 56 are connected to a common line 57 which is energized by the Zero output of flip-flop 78. Therefore, energizing line 53 with a negative pulse will result in transistors 41 to 46 being turned on, thus allowing a direct connection between input lines 34 to 39 and output lines 47 to 52, respectively. Energizing line 57 with a negative pulse will result in transistors 54 to 56 being turned on. This will allow a direct connection between input lines 34 to 36 and output lines 50 to 52, respectively.

The operation of flip-flop 78 is controlled by a mode selector switch which may be located conveniently on the typewriter device 1. The selector switch includes a pair of flip-flop devices 58 and 59 which are used to select the alpha-numeric and octal modes, respectively. The set and clear inputs 60 and 61 of flip-flop 58 and the set and clear inputs 62 and 63 of flip-flop 59 are adapted to receive negative control pulses from any convenient source, such as a manual push-button arrangement (not shown).

When the system is to operate in the alpha-numeric mode which utilizes six binary bits of information to each byte, it is necessary for transistors 41 to 46 to be biassed on continuously. This means that line 53 from the One input of flip-flop 78 must remain energized. To accomplish this the operator pushes the appropriate button to energize set input 60 to flip-flop 58 thereby energizing line 64. The pulse at set input 60 also appears on line 75 and is passed through OR circuit 70 to line 71 where it causes the flip-flop 78 to be set in the One condition. This insures that the gating circuits will be properly conditioned to receive the first character from the encoder. A pulse generator 65 is coupled to the typewriter mechanism in such fashion that line 66 is pulsed after each code character is typed. The pulse on line 66 samples gate 67 and gate 68. Since gate 68 has been conditioned by a D.C. level on line 64, the pulse on line 66 is allowed to pass through gate 68, along line 69 to OR circuit 70. OR circuit 70 allows the pulse to pass and set line 71 of flip-flop 78 is pulsed to set flip-flop 78 to the One condition. Flip-flop 78 remains in the One condition until it is cleared by energizing clear input 61 to flip-flop 58. In this instance energizing clear input 61 to flip-flop 58 does not change flip-flop 78, but merely removes the D.C. level from line 64.

When the octal code is used, it becomes necessary to energize alternately lines 53 and 57 of flip-flop 78, since an octal byte contains only three binary bits of information. When reading in the octal bytes, they are read in first on lines 47 to 49 and then lines 50 to 52, a process which is successively repeated in this order.

To initiate operation in the octal mode, a negative pulse is placed on line 62 by an appropriate push-button means or other means not shown. The negative pulse on line 62 sets flip-flop 59 in the One state, thereby placing a D.C. level on line 72. The input pulse on set input 62 also energizes line 73 to OR circuit 70, which pulses set line 71 and insures that flip-flop 78 will be set to the One condition initially. The next pulse from pulse generator 65, which is operated after each typewriter key, samples gate 67 which has been conditioned by the D.C. level on line 72. Gate 67 allows the pulse to pass through along line 74 to the complement input of flip-flop 78. Each subsequent pulse from the pulse generator 65 will complement flip-flop 78 as long as the octal mode remains selected.

Figure 5:
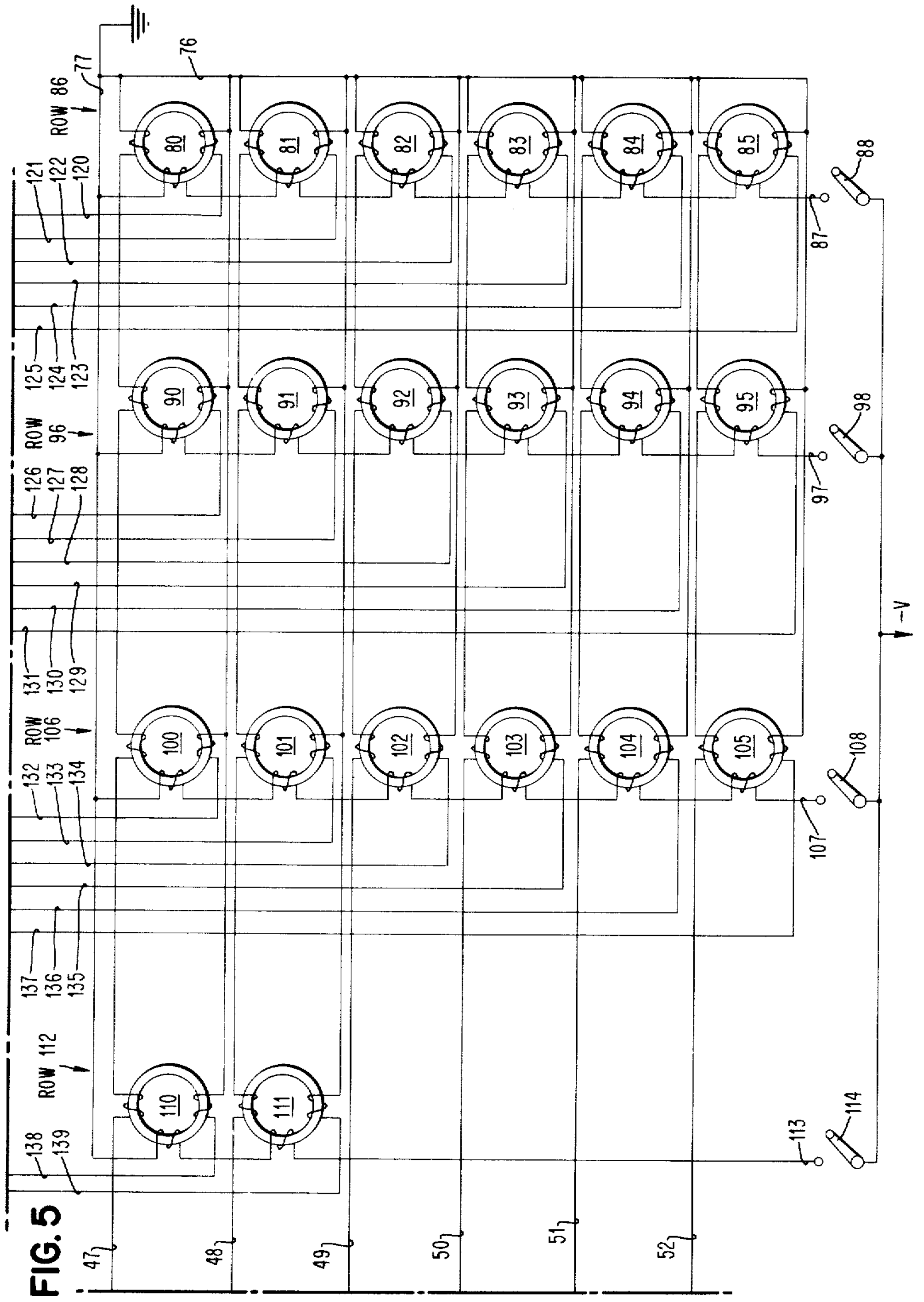
FIG. 5 is a circuit diagram of the magnetic core transfer matrix.

The magnetic core transfer matrix is shown in FIG. 5 of the drawings. The matrix is made up of three rows containing six cores each, and one row containing two cores. The core elements are bistable in nature, being constructed of magnetic material having a rectangular hysteresis loop characteristic. Information is fed into the matrix on lines 47 to 52, which are the output lines of the gating circuits 5. Line 47 is wound about cores 110, 100, 90 and 80 to a ground bus 76. Line 48 is wound about cores 111, 101, 91 and 81 to ground bus 76. Line 49 is wound about cores 102, 92 and 82 and terminates at ground bus 76. Line 50 is wound about cores 103, 93 and 83 to ground bus 76. Line 51 is wound about cores 104, 94 and 84 to ground bus 76. Line 52 is wound about cores 105, 95 and 85 to ground bus 76.

Each core in the matrix is provided with a bias winding. Cores 80 to 85 in row 86 are threaded by a bias line 87, which is wound about each core and terminates on ground bus 77. Cores 90 to 95 in row 96 are threaded by a bias winding 97 which also is connected to ground bus 77. Similarly, cores 100 to 105 in row 106 and cores 110 and 111 in row 112 are provided with bias windings 107 and 113, respectively. Each of bias windings 87, 97, 107 and 113 is connected to a source of negative potential —V through a plurality of switches 88, 98, 108 and 114, respectively. While these switches are illustrated diagrammatically as being simple mechanical make and break switches, it will be understood by those skilled in the art that these switches could be replaced by equivalent electronic switches such as vacuum tubes, transistors, relays, magnetic core elements, etc.

Each magnetic core in the matrix is also provided with an output or sense winding. Cores 80 to 85 of row 86 are wound with output windings 120 to 125. Cores 90 to 95 of row 96 are wound with output windings 126 to 131. Cores 100 to 105 of row 106 are wound with output windings 132 to 137; and cores 110 and 111 of row 112 are wound with output windings 138 and 139. Each of the output windings has one end grounded and the other end serves as an output lead to the word register 9.

The matrix is utilized by applying a bias voltage to all cores through which no information is to pass. This bias voltage holds the cores in the Zero state and prevents them from changing state when an information pulse passes through. For example, if information is to be transferred through row 86 of the matrix to output leads 120 to 125, then switches 98, 108 and 114 would be closed while switch 88 remains open. It will be seen that the row of cores which is to be used in the transfer process is not connected to the source of bias voltage −V, while all of the remaining rows which are not to be used are connected to this bias voltage. The information pulses passing through the core windings on the unbiased cores produce a change in the stable states of the cores to the One state and cause negative output pulses to be developed in the output windings. The word register used in conjunction with the matrix is desiged to respond to these negative pulses. When the bias voltage is applied to the previously unbiased cores, all of the cores are returned to the Zero state and those cores which were in the One state will cause positive pulses to be developed in their output windings. These positive pulses are of no consequence since the word register responds only to negative pulses. The operation of the matrix will be understood more readily when followed in conjunction with the operation of the entire system which will be described subsequently.

Figure 6:
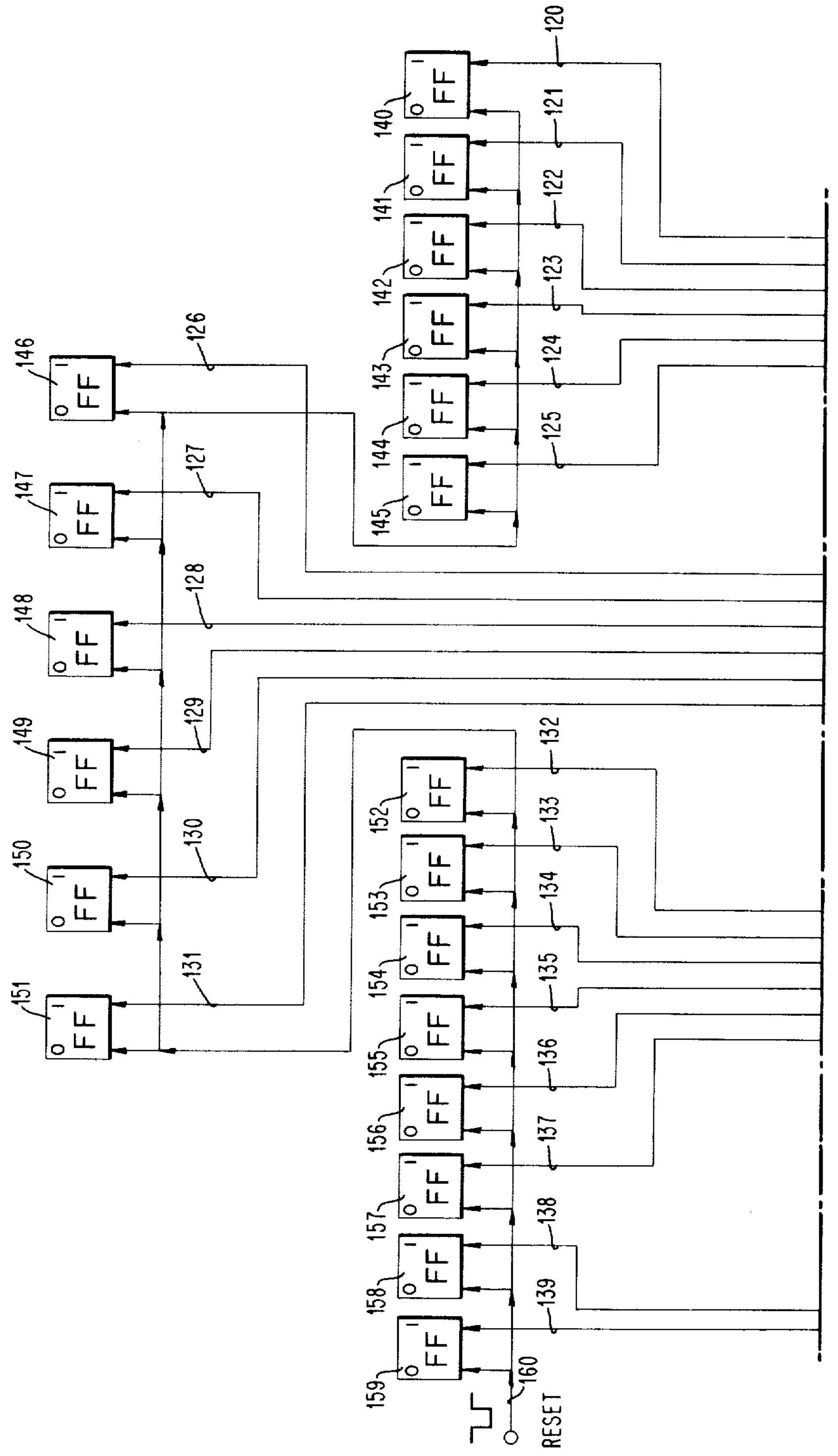
FIG. 6 is a diagram of the word register together with the inputs from the magnetic core transfer matrix.

The word register 9 is shown in FIG. 6 as comprising a plurality of flip-flop devices 140 to 159. A reset line 160 energizes the Zero input to each of these flip-flops to clear the flip-flops of information when line 160 is pulsed with a negative pulse. Output lines 120 to 139 are fed to the One inputs of each of these flip-flop devices to store the information transferred from the core transfer matrix 7.

The operation of the system will now be described by following through the placing of several characters in the octal code from the typewriter keyboard to the word register 9. Assuming that typewriter key 10 is depressed, line 21 will be energized and cores 26, 27 and 28 will be changed to the One state. The condition of cores 29 to 31 is immaterial since the device is operating in the octal mode, and only three bits of information are utilized for each byte or character.

When it is desired to read out the information from the encoder 3, a negative pulse is applied to line 32. This pulse serves to return cores 26 to 31 to the Zero state, if they are not already in such state. Since cores 26, 27 and 28 were in the One state, an output pulse will be generated on lines 34, 35 and 36 and appear at the collector elements of transistors 41, 42, 43, 54, 55 and 56.

Since the octal mode is being utilized, the operator sets the mode selector switch on the typewriter prior to depressing typewriter key 10. This mode selector switch energizes line 62 of the set input to flip-flop 59, and also energizes lines 73 and 71 which sets flip-flop 78 to the One state as described previously. When flip-flop 78 is set to the One state, line 53 is energized and consequently transistors 41 to 46 are biassed on. Line 57 is not energized, therefore, transistors 54, 55 and 56 are turned off.

The negative pulses appearing at the collector elements of transistors 41, 42 and 43 will be passed through, since these transistors are turned on, but the pulses at the collector elements of transistors 54, 55 and 56 will not get through, since these transistors are turned off. The fact that transistors 44, 45 and 46 are also turned on will not affect the operation of the device in the octal mode, because only three bits of information are present in each byte and there is no information on the lines leading through the transistors 44 to 46.

Prior to initiating the operation of the input device, the word register 9 is cleared by applying a reset pulse on line 160. The magnetic core transfer matrix is also set to receive the first character of a new word by closing switches 98, 108 and 114 thereby biassing rows 96, 106 and 112 so that no information can pass through these rows of cores to the word register. Switch 88 remains open and row 86 is conditioned to pass information from the gating circuits 5 to the word register 9.

It will be seen, therefore, that the pulses appearing on lines 47, 48 and 49 will energize magnetic cores 80, 81 and 82 and produce output pulses on lines 120, 121 and 122 which will set flip-flops 140, 141 and 142 of word register 9.

After the depression of typewriter key 10, the pulse generator 65 will produce a pulse on line 66, as described previously, to complement flip-flop 78 to the Zero state, which turns off transistors 41 to 46 and turns on transistors 54 to 56. Switch 88 of the magnetic core matrix bias circuit remains open and switches 98, 108 and 114 remain closed. The system is now ready to receive the second octal character.

Assuming that the second octal character is entered by depressing typewriter key 11, line 22 will energize cores 27 and 28 placing them in the One state. All of the cores of the encoder 3 were previously returned to the zero state by a read pulse on line 32. A subsequent read pulse on line 32 will produce output pulses on lines 35 and 36. These output pulses will appear at the collector elements of transistors 42, 43, 55 and 56. Since transistors 42 and 43 are turned off, nothing will go through on these lines, but transistors 55 and 56 are turned on and the pulses will pass through these transistors to lines 51 and 52. The pulses on lines 51 and 52 will energize cores 84 and 85 of row 86 and produce output pulses on lines 124 and 125, which will set flip-flops 144 and 145 to the One condition.

After the depression of typewriter key 11, the pulse generator 65 produces an output pulse which again complements flip-flop 78 and places it in the One condition. Since six bits of information have been read into word register 9, row 86 of magnetic core transfer matrix 7 is now biassed off by closing switch 88, and row 96 is conditioned by opening switch 98.

The next octal character may be placed in word register 9 by depressing typewriter key 12. This energizes line 23 which sets cores 26 and 28 to the One state. A read pulse on line 32 now produces output pulses on lines 34 and 36, and since transistors 41 and 43 are biassed on and transistors 54 to 56 are biassed off, the pulses pass through to lines 47 and 49 of the magnetic core matrix 7. The pulses on lines 47 and 49 are transferred through cores 90 and 92 of row 96 to lines 126 and 128, which energize flip-flops 146 and 148, respectively. In this manner, it is possible to successively transfer six bytes or characters of octal information into word register 9 by appropriately controlling the gating circuits 5 and the bias lines 87, 97 and 107 in the manner described.

Cores 110 and 111 of row 112 are utilized when operating in the octal mode to increase the higher order significant figures. This row cannot transfer a complete three bit byte, but by providing these two additional cores it is possible to write as high as 3777777 as compared with 777777 in an eighteen core matrix.

The alpha-numeric mode of operation of this system is similar to the octal mode of operation except that it is not necessary to complement flip-flop 78 to sequentially energize lines 47 to 49 and then lines 50 to 52 of the magnetic core transfer matrix 7. This is because in the alpha-numeric mode all six input lines to the matrix are used in each transfer operation. Also, when the alpha-numeric mode of operation is utilized, the bias switching circuits must be operated at twice the speed of the octal mode, since each operation utilizes a complete row of cores and a new row must be conditioned after each operation.

The alpha-numeric mode of operation is selected by pulsing set line 60 to flip-flop 58. When set line 60 is pulsed, the pulse is carried by line 75 to OR circuit 70 which allows the pulse to go through and set flip-flop 78 to the One condition. Subsequent pulses from pulse generator 65, which occur after each typewriter key is depressed, continue to pulse set line 71 of flip-flop 78, as described previously, to insure that flip-flop 78 remains in the One condition while the alpha-numeric code is being used.

For the beginning of each new computer word to be entered into register 9, row 86 of the magnetic core matrix is conditioned by opening switch 88 and the other rows are biassed off by closing switches 98, 108 and 114. Assuming that typewriter key 13 is depressed, line 24 will energize cores 26, 27, 29, 30 and 31 to change them from the Zero state to the One state. A subsequent read pulse on line 32 will return all cores to the Zero state and energize lines 34, 35, 37, 38 and 39. Since line 53 remains energized while the alpha-numeric mode is being utilized, transistors 41 to 46 are always biassed on. Consequently, the pulses on lines 34, 35, 37, 38 and 39 pass through the gating circuits to input lines 47, 48, 50, 51 and 52 of the magnetic core transfer matrix. The pulses on these lines are passed through cores 80, 81, 83, 84 and 85 to output lines 120, 121, 123, 124 and 125 which energize flip-flops 140, 141, 143, 144 and 145, respectively, of word register 9.

After the first alpha-numeric character is entered into word register 9, switch 88 of the bias arrangement of matrix 7 is closed to bias off row 86 and switch 98 is opened to condition row 96. Flip-flop 78 remains in the One condition so that transistors 41 to 46 stay turned on.

When the next alpha-numeric key 14 is depressed, line 25 energizes core 36 and core 38 of encoder 3. The pulses thus formed are passed through transistors 43 and 45 to input lines 49 and 51 of the core matrix. Lines 49 and 51 energize cores 92 and 94, which produce output pulses on lines 128 and 130 to the set inputs of flip-flops 148 and 150 of word register 9. If the computer word contains three alpha-numeric characters, the third character would be similarly entered into word register 9 through row 106 of the magnetic core transfer matrix 7. The remaining row 112 is generally not used in alpha-numeric operation.

Having finished the description of the system illustrated in FIGS. 1 to 6 of the drawings, it is appropriate at this point to describe in detail the circuits employed in the various blocks illustrated in FIGS. 1, 4 and 6. The operation of the individual circuits or blocks will be understood more clearly by referring to FIGS. 7 to 10 which are schematic diagrams showing the component parts and the manner in which they are interconnected to perform the various functions. In each instance the circuits are responsive to negative pulses, and the common reference potential or ground may be regarded as positive. In the absence of specific reference to positive pulses, all pulses are assumed to be negative. It will be understood by those skilled in the art that this particular manner of establishing polarities and reference potentials can be varied as the situation demands, and the embodiments illustrated are by way of example only and are not intended to restrict the mode of operation of the circuitry shown.

Figure 7:
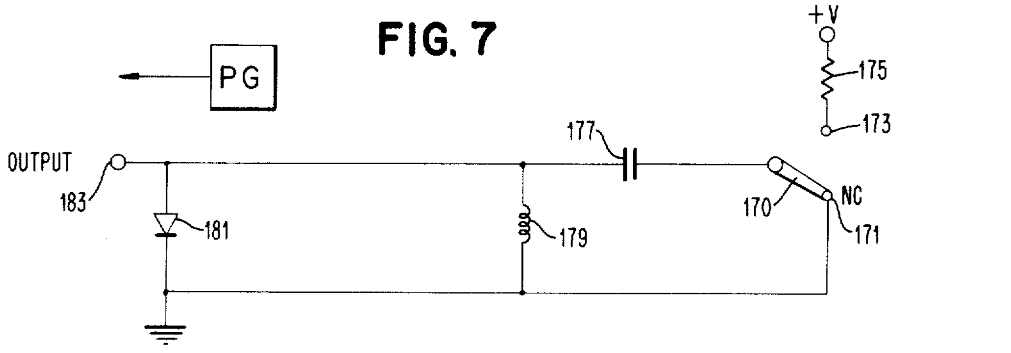
FIG. 7 is a circuit diagram of the pulse generator shown in FIG. 4.

FIG. 7 is a diagram of the pulse generator used to generate a single negative pulse each time a key of the typewriter input device is operated. The generator is operated by a mechanical switch having a movable contact bar 170. In its normally closed position contact bar 170 is closed against contact 171, and in the opposite position the contact bar 170 closes against contact 173, which is connected through resistor 175 to a soure of positive potential +V. The circuit includes a condenser 177 in series with contact bar 170. An inductance 179 and a rectifier 181 are connected in parallel to ground from one side of condenser 177. Terminal 183 provides the output from this generator.

The pulse generator circuit is intended for use on control panels where push-button pulses are required, and the circuit contains passive elements only. Contact bar 170 is operated in conjunction with each typewriter key and for purposes of description, it may be assumed to be the key itself. When the typewriter key is depressed, contact 170 closes against 173 and condenser 177 is charged. The contact bar 170 then falls back to its normally closed position against contact 171 allowing the condenser to discharge producing damped oscillations. Rectifier 181 shorts the output of the condenser discharge to ground after the first half-cycle. The output at terminal 183 is therefore a single negative pulse. This operation is repeated with the depression of each typewriter key such that a negative output pulse is obtained with each key operation.

Figure 8:
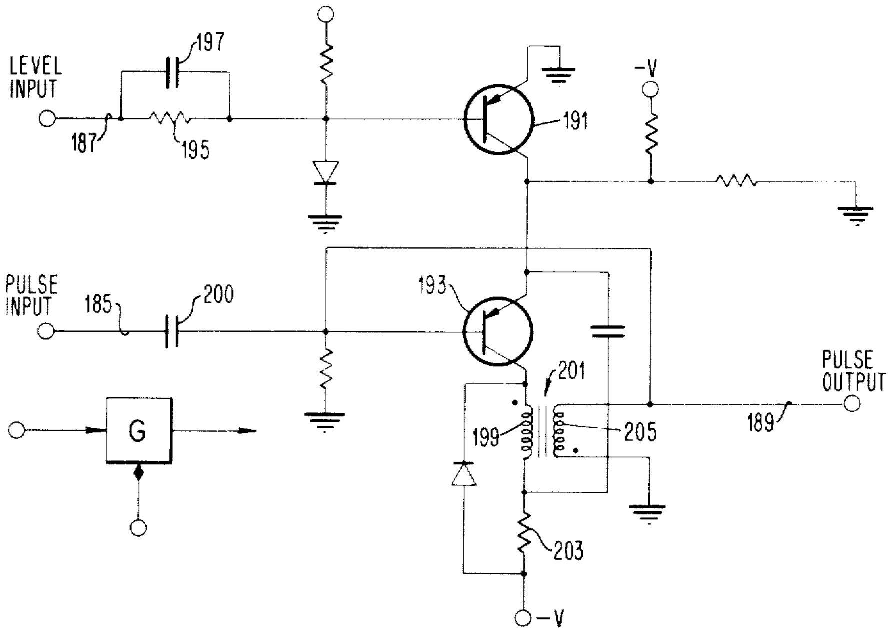
FIG. 8 is a circuit diagram of a basic gate such as shown in FIG. 4.

Referring next to FIG. 8, a gate circuit illustrated in block form in FIG. 4 is shown in detail. This circuit responds to a negative pulse on input line 185 and a negative input level on line 187 to provide a negative output pulse on line 189. The gate circuit includes two transistors 191 and 193 connected in series. If a negative input level is applied to input line 187 and through the RC network 195, 197 to the base of transistor 191, this transistor is thus conditioned. A negative input pulse subsequently applied to line 185 through condenser 200 to the base electrode of the transistor 193 will cause transistor 193 to conduct, because the transistor 191 has been conditioned previously by the negative level on input line 187.

For the duration of the negative input pulse, there is current from ground through the transistor 191, transistor 193, primary winding 199 of transformer 201, and resistor 203 to a source of negative potential −V. Consequently, a negative pulse is induced in secondary winding 205 of transformer 201, and this pulse appears on output line 189. If the input level to line 187 is positive, or at ground potential, when a negative pulse is applied to the input line 185, the transistor 191 is rendered non-conductive and the negative pulse applied to the base of transistor 193 is ineffective to cause conduction. Hence, no current is produced in primary winding 199 and no output pulse is developed on output line 189.

Figure 9:
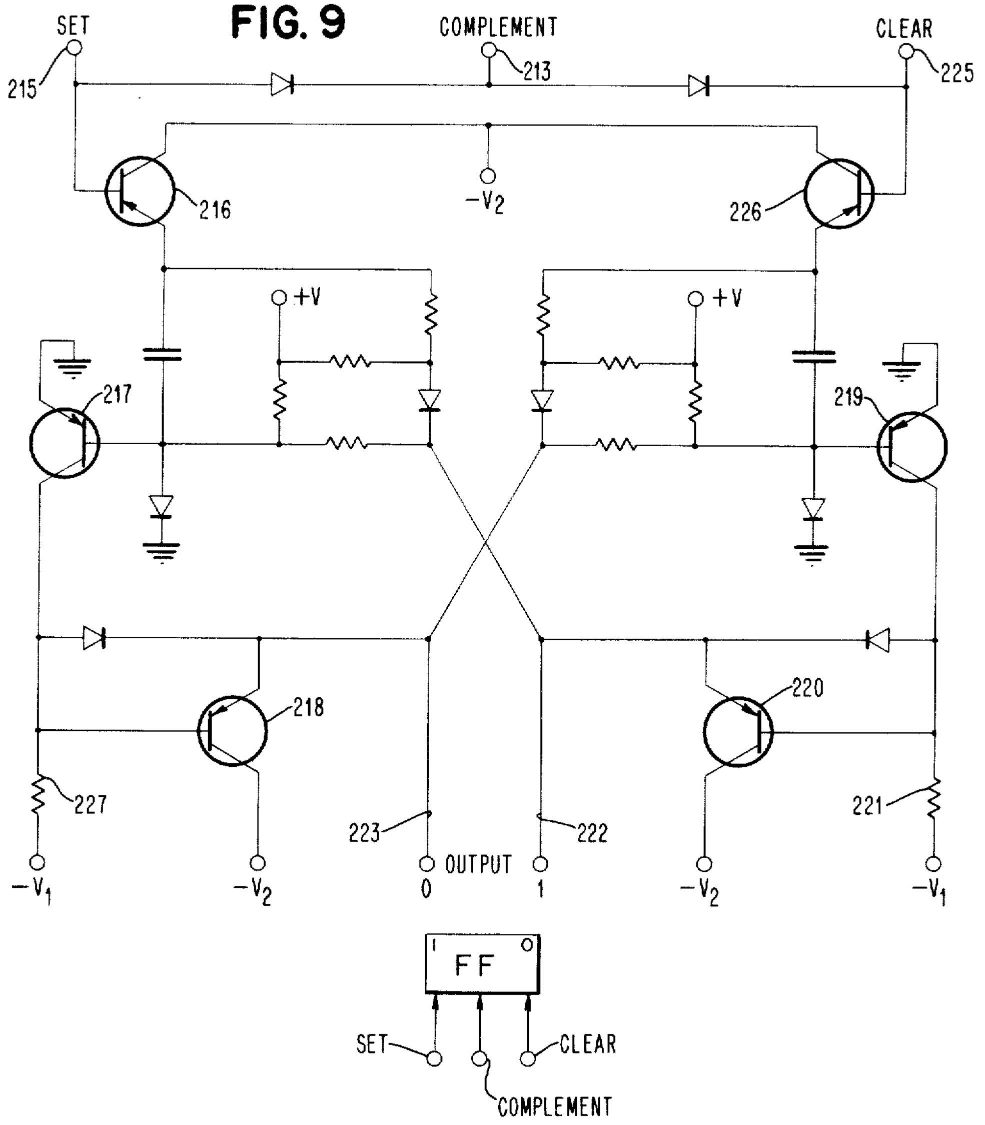
FIG. 9 is a circuit diagram of a basic flip-flop device such as shown in FIGS. 4 and 6.

FIG. 9 is a detailed illustration of a flip-flop circuit which may be employed for the flip-flops illustrated in block form in FIGS. 4 and 6. The input terminals to the flip-flop include a set line 215, a complement line 213 and a clear line 225. Output lines 222 and 223 are for the One and Zero conditions respectively. Assuming for purposes of description that a pulse is applied to input line 215, the flip-flop will be set to the One condition thereby providing a negative output signal from line 222. The input pulse on line 215 accomplishes this action by driving transistor 216 into conductive state which applies a negative signal to the base of transistor 217, rendering this transistor conductive. When the transistor 217 conducts, the base of transistor 218 approaches ground potential thereby turning off transistor 218 which was previously conducting when the flip-flop was in the Zero state. As a consequence of this action, the base of transistor 219 is raised to a potential at or above ground potential which turns off transistor 219. When the transistor 219 is turned off, transistor 220 is turned on because the base electrode of transistor 220 is subjected to a negative potential supplied by the source $-V_1$ through a resistor 221. When the transistor 220 is turned on, the negative potential source $-V_2$ applied to the collector electrode of transistor 220 is coupled through the transistor to output line 222 which is the One condition output. The negative potential at output line 222 is coupled back to the base of the transistor 217 and maintains this transistor in a conductive state. When the negative input pulse to input line 215 terminates, the transistors 217 and 220 remain conductive whereby output line 222 is at a negative potential and output line 223 is at or above ground potential. In this state the flip-flop is said to be in the One condition.

If a negative pulse is applied to the input line 225, the flip-flop changes from the One condition to the Zero condition. The sequence of events which accomplishes this action may be followed by noting that the negative pulse on input line 225 turns on transistor 226. Transistor 226 then supplies a negative signal to the base of transistor 219, rendering it conductive. When the transistor 219 turns on, the base element of transistor 220 is raised to ground potential turning off transistor 220. Transistor 217 also turns off with transistor 220 since the negative holding potential previously supplied by transistor 220 to the transistor 217 is now removed. After transistor 217 turns off, the base of transistor 218 goes negative, since a negative source of potential $-V_1$ is coupled through a resistor 227 thereto. The negative potential applied to the base of transistor 218 renders this transistor conductive, and the negative potential connected to the collector electrode of transistor 218 is coupled to the ouput line 223. The negative potential at the output line 223 is coupled to the base of transistor 219 and biasses on this transistor. When the negative pulse on input line 225 terminates, transistors 218 and 219 remain conductive, whereby the output line 223 continues at a negative level and the output line 222 remains at a level at or above ground potential. In this condition of stability, the flip-flop is said to be in the Zero state.

If a negative pulse is applied to the complement input line 213, the flip-flop undergoes a change in state. If the flip-flop is in the Zero condition, it is changed to the One condition. If the flip-flop is in the One condition, it is changed to the Zero condition.

Assuming that the flip-flop is in the Zero condition when a negative puse is applied to the complement input line 213, both transistors 216 and 226 will be turned on. Transistors 216 and 226 supply negative signals to the bases of transistors 217 and 219, respectively. These negative signals will turn on transistor 217 and not affect transistor 219, since this transistor is already turned on. Turning on transistor 217 is effective to initiate the sequence of events described above when a negative pulse was applied to input line 215, and the flip-flop is complemented or changed in state from the Zero condition to the One condition. If the flip-flop is in the One condition when a negative pulse is applied to the complement input line 213, transistor 219 will be turned on and the sequence of events described earlier with respect to an input pulse on input line 225 will be initiated. Accordingly, it is seen that a pulse applied to the complement input line 213 of the flip-flop is effective to reverse the existing condition of the flip-flop.

Figure 10:
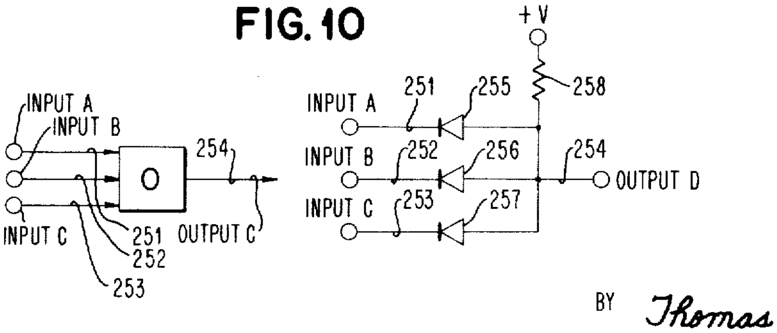
FIG. 10 is a circuit diagram of a basic OR circuit such as shown in FIG. 4.

Referring now to FIG. 10, an OR circuit is illustrated in detail. The OR circuit responds to a negative pulse on any one of the input lines 251, 252 or 253 and provides a negative output on line 254. Diode elements 255, 256 and 257 are connected as shown through a resistor 258 to a positive source of potential +V. Normally the input conductors 251 to 253 are at ground potential and the diodes 255 to 257 are conducting. Hence, the output potential on line 254 is normally at or slightly above ground potential. If a negative pulse is applied to any one of the input conductors 251 to 253, a negative output pulse will be produced on line 254.

To illustrate the operation of this OR circuit, assume that a negative pulse is applied to the line 251. This negative pulse is passed by the diode 255 to the output line 254. When line 254 goes negative, the diodes 256 and 257 are rendered non-conductive, assuming that the input lines 252 and 253 remain at ground potential. As soon as the negative pulse on input line 251 terminates, this lines returns to ground potential, and the ground level is conveyed to output line 254. At this point diodes 256 and 257 are rendered conductive again.

The complete system environment, as well as the individual circuit operation having been described, is readily seen that the magnetic core transfer matrix of the present invention provides a faster and more reliable means of transferring information from one register to another than the conventional shifting registers previously employed. The transfer matrix requires fewer and less costly components as well as less space than the shift register apparatus required to perform the same function. The present construction also provides greater reliability, since fewer components are needed. The elimination of the shift gate on the word register makes this register less complex operationally, more susceptible to error detection, and therefore more easily maintained.

It will be appreciated by those persons skilled in the art that the detailed circuitry described above may be replaced by equivalent circuits which perform the same function. Therefore, the invention is not limited to any specific circuit construction, but rather is directed to the novel cooperation of the various functional circuits as set forth in the following claims.

What is claimed is:

1. In a data processing system the combination of an encoder for encoding information in a plurality of binary codes comprising a plurality of bistable magnetic core elements, the number of said cores being equal to the largest number of bits of information per character required by any code being used, a plurality of input lines, each input line representing a character and having windings upon the corresponding cores in said encoder to produce the desired binary character information, a winding common to all cores for reading out the coded characters and resetting the cores, and an output winding on each core for developing output signals in response to a reset pulse on said common winding; a register for storing a complete binary word where the word is made up of a plurality of said binary characters; and means for transferring said binary characters from said encoder to said register, said means for transferring comprising a magnetic core matrix having means for conditioning given ones of the magnetic cores in said matrix and a plurality of gating circuits between said encoder and said magnetic core matrix for selectively gating signals indicative of said binary characters into said matrix in accordance with a selected code to transfer directly signals indicative of said binary characters into predetermined positions in said register without shifting in said register or storing in said matrx.

2. The combination of claim 1 wherein said means for conditioning said magnetic cores comprises bias windings on said cores and means for energizing said windings.

3. In a data processing system the combination of an encoder for encoding information in a plurality of binary codes comprising a plurality of bistable magnetic core elements, the number of said cores being equal to the largest number of bits of information per character required by any code bing used, a plurality of first input lines, each of said first input lines representing a character and having windings upon the corresponding cores in said encoder to produce the desired binary character information, a winding common to all cores for reading out the coded characters and resetting the cores, and an output winding on each core for developing output signals in response to a reset pulse on said common winding; a register for storing a complete binary word where the word is made up of a plurality of said binary characters; and means for transferring said binary characters from said encoder to said register, said means for transferring comprising a magnetic core matrix made up of a plurality of rows of bistable magnetic core elements, a plurality of second input lines comprising windings threading corresponding cores in each of said rows, said plurality of second input lines including a plurality of gating circuits which are selectively energized in accordance with a given one of a plurality of binary codes to enable said matrix to transfer information in said one code, a bias winding for each row threading all of the cores in said row, an output comprising windings for each core in said matrix, and means to selectively bias said rows of cores whereby input signals may be transferred directly from said second input lines to the output of any given row for storage in said register without shifting in said register or storing in said matrix.

4. In a data processing system the combination comprising an input device capable of operation in a plurality of binary codes; an encoder for encoding information in a plurality of binary codes, said encoder comprising a plurality of bistable magnetic core elements, the number of said cores being equal to the largest number of bits of information per character required by any code being used, a plurality of first input lines connecting said input device to said encoder, each of said first input lines representing a character and having windings upon the corresponding cores in said encoder to produce the desired binary character information, a winding common to all cores for reading out the coded characters and resetting the cores, and an output winding on each core for developing output signals in response to a reset pulse on said common winding; a register for storing a complete binary word; a magnetic core matrix for transferring instantaneously, and without storage, binary characters from said encoder to said register, said matrix including a plurality of rows of bistable magnetic cores; a plurality of second input lines connecting the output of said encoder to said magnetic core matrix, said second input lines including a plurality of gating circuits having transistor switch elements in series therewith, said transistor switch elements being selectively energized by a mode control switch to determine a given binary code pattern, said second input lines further threading corresponding cores in each of the rows of the magnetic core matrix; a bias winding for each row of the magnetic core matrix threading all of the cores in each row; output means comprising windings for each core in said matrix; and means to selectively bias said rows of cores whereby input signals may be transferred directly from said second input lines to the output means of any given row for storage in said register without shifting in said register or storing in said matrix.

References Cited by the Examiner

UNITED STATES PATENTS

| | | | |
|---|---|---|---|
| 2,691,152 | 10/54 | Stuart-Williams | 340—174 X |
| 2,691,153 | 10/54 | Rajchman et al. | 340—166 |
| 2,708,267 | 5/55 | Weidenhammer | 340—166 |
| 2,734,182 | 2/56 | Rajchman | 340—174 X |
| 2,750,580 | 6/56 | Rabenda et al. | 340—174 |
| 2,768,367 | 10/56 | Rajchman | 340—174 |
| 2,776,419 | 1/57 | Rajchman et al. | 340—174 |
| 2,801,406 | 7/57 | Lubkin | 340—173 |
| 2,802,203 | 8/57 | Stuart-Williams | 340—174 |
| 2,824,294 | 2/58 | Saltz | 340—174 |
| 2,843,838 | 7/58 | Abbott | 340—166 |
| 2,870,429 | 1/59 | Hales | 340—173 |
| 2,872,666 | 2/59 | Greenhalgh | 340—174 |
| 2,882,517 | 4/59 | Warren | 340—174 |
| 2,907,004 | 9/59 | Kun Li Chien et al. | 340—174 |
| 2,931,014 | 3/60 | Buchholz et al. | 340—174 |
| 2,931,022 | 3/60 | Triest | 340—174 X |
| 2,932,451 | 4/60 | Beattie et al. | 340—174 X |
| 2,933,720 | 4/60 | Newhouse et al. | 340—174 |
| 2,946,985 | 7/60 | McMillian et al. | 340—174 |
| 2,947,804 | 8/60 | Eilers et al. | 340—174 X |
| 2,947,977 | 8/60 | Bloch | 340—174 |
| 2,951,240 | 8/60 | Bobeck | 340—174 |
| 2,964,737 | 12/60 | Christopherson | 340—174 |
| 2,964,739 | 12/60 | Dirks | 340—174 |
| 2,968,028 | 1/61 | Eiichi Goto et al. | 340—174 |
| 2,975,405 | 3/61 | Hammer | 340—172.5 |
| 2,981,931 | 4/61 | Tate | 340—174 X |
| 3,011,165 | 11/61 | Angel et al. | 340—347 |
| 3,034,114 | 5/62 | Lerner et al. | 340—347 |
| 3,076,181 | 1/63 | Newhouse et al. | 340—166 |
| 3,079,597 | 2/63 | Wild | 340—347 |

OTHER REFERENCES

Pages 194–197, 3/55, Publication II "New Ferrite-Core Memory Uses Pulse Transformers," by Papian in Electronics.

Pages 1407–1421, 10/58—Publication I: "A Myriabit Magnetic Core Matrix Memory," by Rajchman in Proceedings of the IRE.

MALCOM A. MORRISON, *Primary Examiner.*

EVERETT R. REYNOLDS, IRVING L. SRAGOW, *Examiners.*